INVENTOR.
JACK I. RAFFEL
BY
Edward D. Thomas
AGENT

Feb. 10, 1970 J. I. RAFFEL 3,495,224

THIN FILM MEMORY SYSTEM

Filed April 19, 1960 4 Sheets-Sheet 2

INVENTOR.
JACK I. RAFFEL
BY
Edward D. Thomas
AGENT

INVENTOR.
JACK I. RAFFEL
BY
Edward D. Thomas
AGENT

INVENTOR.
JACK I. RAFFEL
BY Edward D. Thomas
AGENT.

1

3,495,224

THIN FILM MEMORY SYSTEM

Jack I. Raffel, Cambridge, Mass., assignor, by mesne assignments, to Massachusetts Institute of Technology, a corporation of Massachusetts Filed Apr. 19, 1960, Ser. No. 23,269
Int. Cl. G11c 5/02, 11/06, 11/14
U.S. Cl. 340—174 22 Claims This invention relates to a magnetic memory system and more particularly to a system which employs thin magnetic films as storage elements which are arranged in coordinate groupings.

Figure 1:
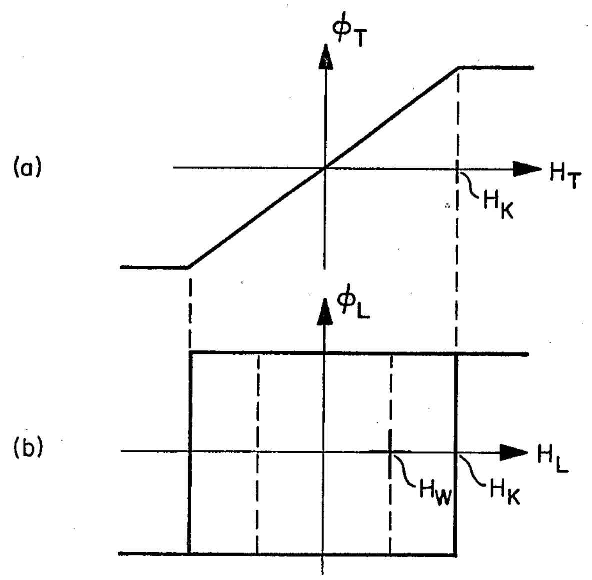

The computer memory element most widely used today is the ferrite core. The ferrite core has a nearly rectangular hysteresis loop and is usually operated in a coincident current mode in random access type memory systems. However, the core type memory experiences some limitations when faster and larger memories are contemplated. Principal among these limitations are the large drive currents required to improve speed, the large drive voltages associated with switching large amounts of flux at high speed, and hysteresis heating in the core.

A thin film of magnetic material in order to be useful as an element in a memory system must have characteristics which allow it to be used in some form of coincident current technique if a random access type of memory is desired. It has been found that Permalloy films when properly energized have characteristics which are suitable for such a memory element. These thin magnetic films overcome many of the problems associated with ferrite cores. Since thin magnetic films are sufficiently like ferrite cores in many respects, many of the ideas used in ferrite core memories are applicable to a film type of memory. However, there are important differences in magnetic behavior between a thin film magnetic element and a ferrite core which gives rise to a new type of magnetic memory system in accordance with the present invention.

In brief, a rotational mode of flux reversal wherein the entire film switches coherently as a single domain is accomplished in the present invention by the application of a transverse magnetic field in time coincidence with a longitudinal magnetic field. This is to be contrasted with the flux reversal which occurs in a ferrite core where the time coincidence of two magnetic fields each acting in the same direction causes flux reversal by a sequential process associated with the formation and motion of domain walls in the material.

A feature of the present invention is that the memory system is capable of being used with arrays of thin film elements whose magnetic characteristics are not uniform.

Another feature of the present invention is that it utilizes a rotational mode of flux switching in the magnetic element which rotational mode of switching can be accomplished in a shorter time than if wall motion type of switching is used.

Another feature of the present invention is that flux reversal in the magnetic memory element can be accomplished by a unidirectional current in one line of a two line coincident current system.

Another feature of the present invention is that the output signal is essentially free of noise because of the orthogonality of the output signal line and the line whose energization causes an output signal.

Another feature of the present invention is that the output signal is positive or negative depending upon whether a ONE or a ZERO had been stored in the memory element.

2

Another feature of the present invention is that the rectangular matrix of thin film magnetic elements uses straight orthogonal drive lines which allow the use of strip-line transmission techniques.

It is, therefore, an object of the present invention to provide a magnetic storage system using thin film magnetic memory elements which has high speed operational capabilities with high accuracy and reliability.

These and other features and objects are achieved by a magnetic memory system which uses thin film magnetic elements arranged in rows and columns on the surface of a glass substrate, together with means for providing a magnetizing force parallel to and a magnetizing force transverse to the easy direction of magnetization of the thin film elements, and a sense winding for information extraction. In the preferred mode of system operation, a linear selection or word organized type of memory is used. In the word organized type of memory, each row of thin film magnetic elements corresponds to a word, each column corresponds to a digit in a word. The direction of easy magnetization of the thin film magnetic elements is in the same direction as a row of elements. Information in the form of a ZERO or a ONE can be read into any element by the simultaneous application of a current in the line producing a longitudinal magnetomotive force and a current in the line producing a transverse magnetomotive force. The orthogonality of these magnetomotive forces will cause rotational switching of the magnetic flux direction in place of the magnetic element which is subjected to the time coincident longitudinal and transverse magnetomotive forces. A sense winding which is capable of determining the direction of flux reversal in the magnetic element provides a voltage whose polarity indicates whether a ONE or a ZERO had been stored in that particular magnetic element.

Figure 8:
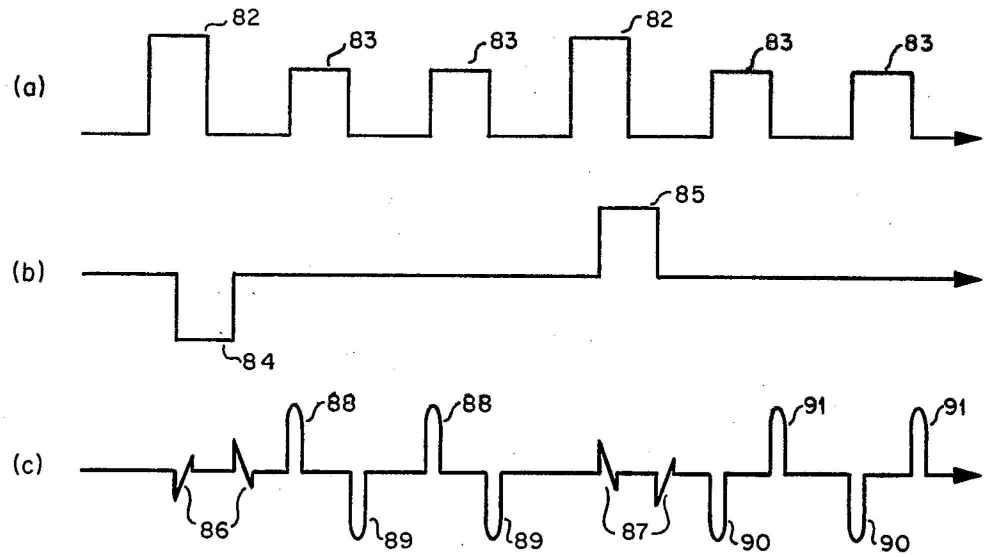
Figure 2:
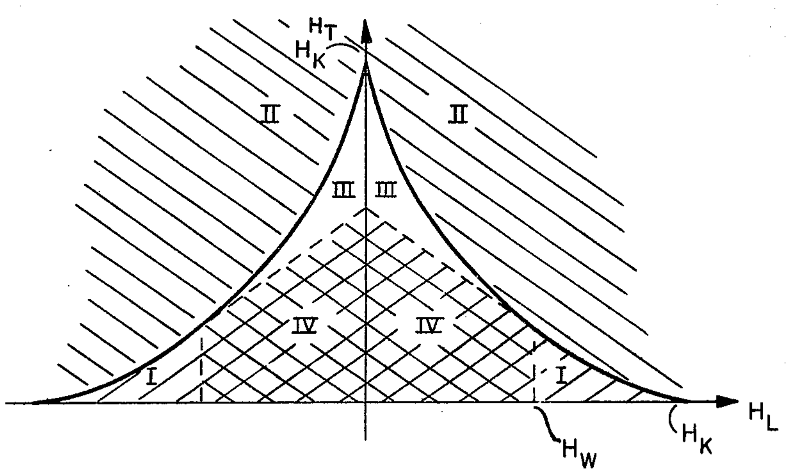
Figure 3:
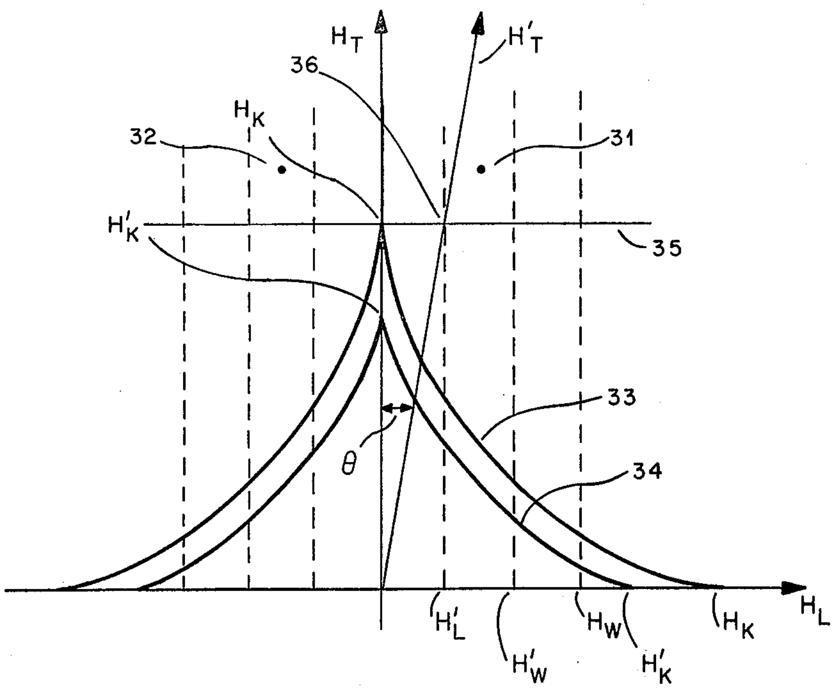
Figure 4:
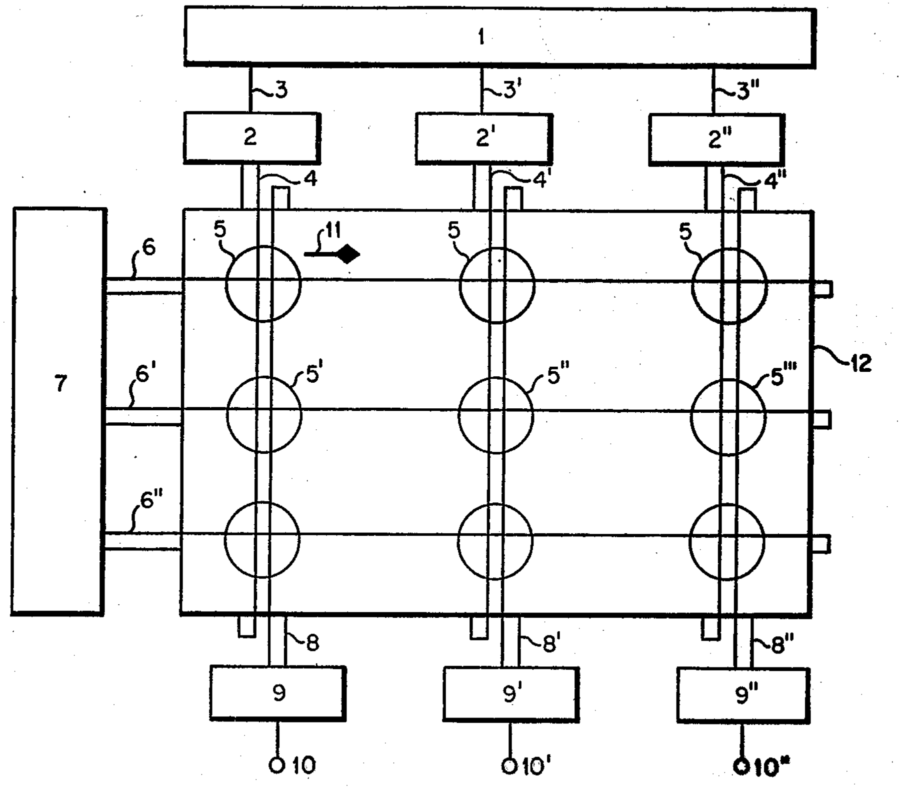
Figure 6:
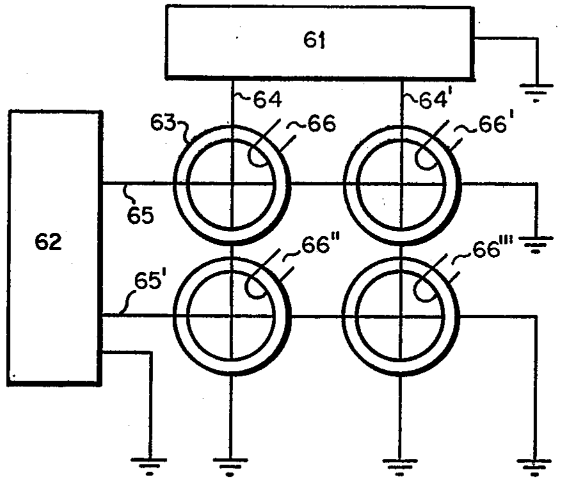
Figure 5:
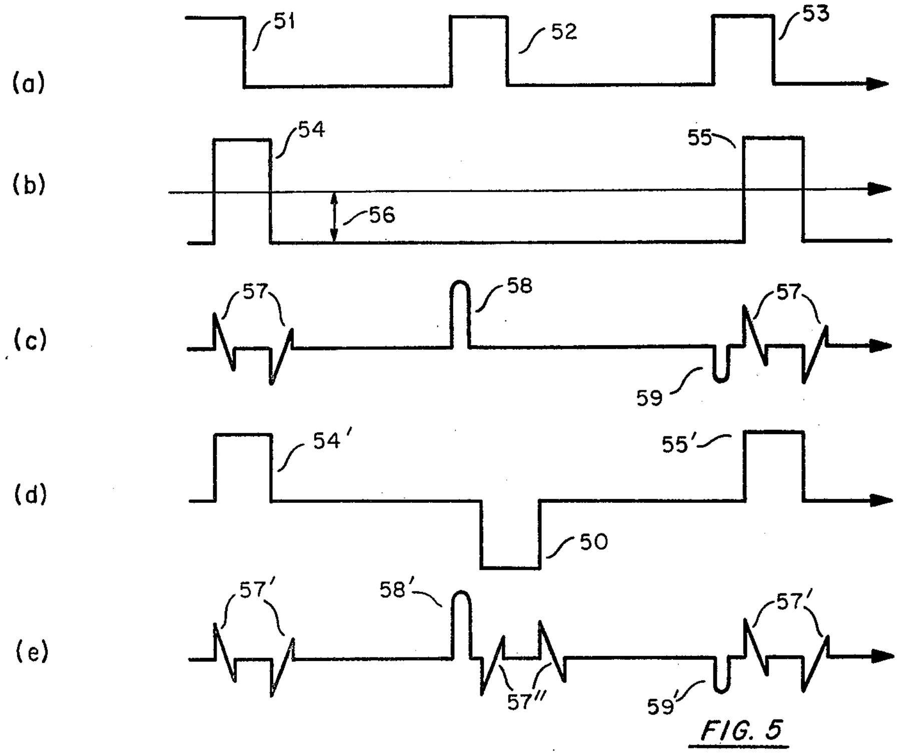
Figure 7:
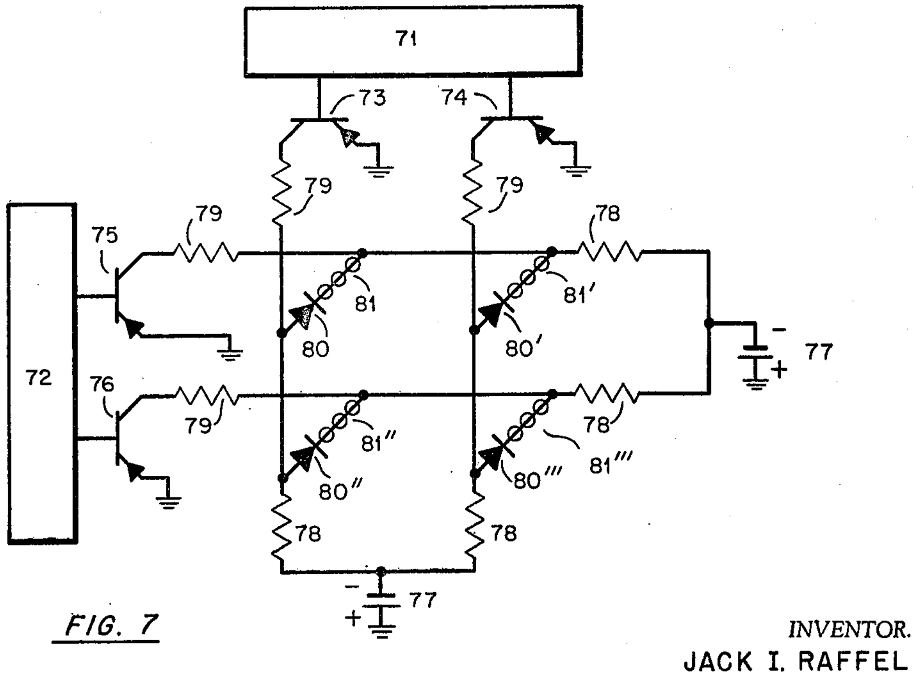

In the accompanying drawings, FIGURE 1 shows approximate hysteresis curves for a thin film magnetic element. FIGURE 2 is a switching threshold curve for a typical thin film element. FIGURE 3 shows the magnetizing force limitation for switching the flux in a thin film element when an array of non-identical elements is considered. FIGURE 4 shows a word organized memory system employing thin film elements. FIGURE 5 shows the current and voltage waveforms typical of the memory system of FIGURE 4. FIGURE 6 shows a core switching circuit. FIGURE 7 shows a diode switching matrix. FIGURE 8 shows the current and voltage waveforms obtained when non-destructive read-out is employed.

Before describing the preferred forms of this invention, certain of the magnetic properties and the method of preparation of a thin film magnetic element will be considered.

The preparation of permalloy films was first described by M. S. Blois, Jr., Journal of Applied Physics, volume 26, page 975, 1955, and his method is still the one most widely used. A typical method for producing thin film elements follows. Nickel and iron pellets in the correct proportion are placed in an alundum crucible and melted by RF induction heating in a bell-jar vacuum system. A vacuum in the $10^{-5}$ mm. Hg region, readily obtained with standard commercial vacuum systems, has been used successfully. The substrate onto which the molten nickel and iron are evaporated is usually glass or mica and is placed about twelve inches above the melt in a copper holder which is provided with an internal heater to maintain the substrate temperature at from 200° C. to 400° C. A shutter placed between the melt and the substrate allows precise control of thickness, which is monitored during evaporation by measuring the electrical resistance of a monitor slide; when the desired thickness is reached, the shutter is closed. Arrays of small spots are obtained by evaporating onto the substrate through a mask or alternatively by etching the films by the use of photoresist techniques.

In order to produce thin film magnetic elements which are useful in the embodiment of the present invention, it is neecssary that the thin film elements have a preferred direction of magnetization. This preferred direction of magnetization, or easy axis, is produced by evaporating the film onto the substrate in the presence of a magnetic field. The direction of the external magnetic field determines the direction of the easy axis of magnetization. The magnetic field can be provided by a pair of coils placed outside the vacuum bell-jar. About 20 oersteds of uniform field in the substrate region has been found satisfactory.

Reasonable uniformity in the magnetic characteristics of the many magnetic elements in the array deposited upon the substrate is necessary for a memory system which will operate with reasonable margins of safety. It has been found that the condition of the surface of the substrate has considerable influence on the magnetic uniformity of elements deposited thereon. Detergents, acetone, ether and distilled water variously have been used to clean a substrate surface, and ultrasonic agitation seems to be desirable. Ion bombardment or evaporation of an undercoating of silicon monoxide upon the surface of a substrate just prior to evaporation of Permalloy thereon provides a clean surface and is found to improve uniformity. One aspect of non-uniformity in the magnetic characteristics of the thin film elements appears in the form of unwanted skewing of the easy axis of the individual memory elements in an array of elements. This skewing is attributed to the different angle of incidence of the atomic beam over the region of the substrate. Evaporation of relatively small areas, approximately two inches on a side, minimizes this angle of incidence effect. Stresses can also introduce skew effects. Stress is minimized by using a composition having low magnetostriction.

Thin film magnetic elements may also be fabricated by electrodeposition techniques as described by Wolf, Katz, and Brain, "Magnetic Properties of Electrodeposited Thin Films," 1959 Electronics Components Conference, Philadelphia, Pa., May 6–8, 1959.

The hysteresis loops for a thin film magnetic element are shown in FIGURE 1. The solid line curves of FIGURE 1 show the hysteresis characteristics for an ideal thin film magnetic element. FIGURE 1(*a*) shows the hysteresis loop obtained when the magnetizing force $H_t$ is applied transverse to the easy direction of magnetization of the thin film element. The flux $\phi_t$ is the flux perpendicular to the easy axis of magnetization which is produced by $H_t$. It is noted that saturation occurs at a value of $H_t$ designated by the symbol $H_k$. For the non-ideal thin film magnetic element the hysteresis curve departs from the ideal by opening up in the sloping portion of the curve.

FIGURE 1(*b*) shows the hysteresis loop obtained when the magnetizing force $H_L$ is applied in a direction parallel to the easy direction of magnetization of the thin film element. $\phi_L$ is the flux in the easy direction. It is to be noted that the coercive force of the ideal thin film element has the same value, $H_k$, as the value of $H_t$ required to produce saturation in the transverse direction. It is also to be noted that the hysteresis loop is extremely rectangular. For the non-idea thin film magnetic element the actual coercive is indicated by the dashed lines of FIGURE 1(*b*), which intercept the $H_L$ axis at $H_w$, the value at which wall switching occurs. It should be noted that the rectangularity of the hysteresis loop of FIGURE 1(*b*) is still retained even though the material be non-ideal. For the purposes of the present invention, a value of $H_w$ approaching $H_k$ is desirable.

FIGURE 2 shows the approximate rotational switching threshold as a function of a magnetizing force consisting of a longitudinal magnetomotive force, $H_L$, and a transverse magnetomotive force, $H_t$. There are four regions of FIGURE 2 which are of interest. Region I is the region in which the direction of flux in the thin film element is reversed by a process known as wall switching. Wall switching occurs when the magnetomotive force has a component, $H_L$, in the same direction as the easy direction of magnetization which exceeds the critical value $H_w$, for the non ideal magnetic material but the component $H_t$ is insufficient to provide rotational switching. Region II is a region where the combination of longitudinal magnetizing force and transverse magnetizing force produces irreversible rotational switching. The term irreversible denotes that the direction of the magnetic field will not revert to its original direction after removal of the magnetizing forces which have caused the reversal. Region III is a region where the magnetic flux is not completely reversed in direction over the entire area of the thin film element, but rather has regions where the flux continues to remain in the original direction and has reversed direction in the remaining area of the thin film element. This behavior is termed incoherent rotational switching and is attributed to local variations in the easy axis direction throughout the thin film magnetic element. Thus, for some small skewed elemental areas, a field transverse to the thin film element easy axis as a whole will contain a longitudinal component of magnetizing force sufficient to cause non-reversible rotational switching in the small elemental areas. Region IV is a region where rotational flux reversal will occur during the application of the transverse and longitudinal magnetizing forces, but will revert to its original direction when said magnetizing forces are removed. This phenomenon is called reversible flux rotation.

Subject to some restrictions to appear subsequently, region II, the region of non-reversible rotational flux switching, defines the operating region and thus determines the values of transverse and longitudinal magnetizing forces which are used in the thin film memory system of the present invention.

Since the thin film magnetic elements as currently manufactured are not uniform in their magnetic properties, a successful memory system must have operating features which allows its use with these available magnetic elements with adequate safety margins. The curves 33 and 34 of FIGURE 3 represent the switching thresholds which are determined by the extreme values of $H_k$ of the individual elements of an array. Typically, variations of plus or minus 10% about a mean value of $H_k$ are to be expected with the manufacturing techniques now employed to produce a matrix of memory elements. The curves 33 and 34 of FIGURE 3 do not include the additional skew effect resulting from the fact that the easy direction of magnetization of the individual elements of the matrix are not all perfectly parallel to one another. If the skew of the easy direction of magnetization of the thin film element is ignored for the moment, it is seen that any combination of transverse magnetizing force and longitudinal magnetizing force which gives a coordinate position lying between the limits $H'_w$ and $-H'_w$ (not shown) and lying above curve 33 will perform satisfactorily in producing rotational reversal of the magnetic field in accordance with the method of invention. However, since the easy directions of magnetization of all the elements are not parallel, it is necessary to restrict the minimum value of $H_L$ to a value which is greater than the longitudinal component of magnetizing force produced on a magnetic element having a skewed easy axis by the nominally transverse magnetizing force. This minimum value of longitudinal magnetizing force is represented on FIGURE 3 by the symbol $H'_L$. The longitudinal component of the magnetizing force produced by the nominally transverse magnetizing force is approximately determined in FIGURE 3 by the abscissa value of the point of intersection 36 of the line 35 through $H_k$ and a vector representing the actual transverse magnetizing force $H_t'$, making an angle $\theta$ with the $H_t$ axis equal to the angular skew of the easy axis of magnetization of the particular element. If the absolute value of $H'_L$ is greater than the abscissa of this point of intersection, then the direction in which the flux will eventually remain is determined by whether $H'_L$ is positive or negative. It is also a feature of the invention that the longitudinal magnetizing force $H_L$ is removed after the transverse magnetizing force $H_T$ has terminated. This assures that the flux direction will be determined by whether the net longitudinal magnetization force is positive or negative. $H_L$ must therefore have values between $H'_L$ and $H'_w$ whereas the value of $H_T$ is unrestricted by skew effects. Typical operating points are shown by points 31 and 32 of FIGURE 3.

Since $H_L$ can be either a positive or a negative value, the typical operating points 31 and 32 are shown symmetrically displaced from axis $H_t$. The direction of $H_L$ will determine the flux direction in the magnetic film element when applied in time coincidence with a transverse magnetizing force $H_t$ of the magnitude sufficient to cause non-reversible rotational switching. As mentioned previously, $H_L$ should be terminated after $H_t$ is terminated. The transverse magnetizing force $H_t$ need not be bidirectional to cause flux reversal, and a unidirectional current is preferred in the present invention since the drive circuitry complexity is reduced thereby when compared to a bidirectional drive circuit.

A memory system using a transverse and a longitudinal magnetizing force on a matrix of thin film memory elements is shown in FIGURE 4. In this figure, the thin film elements 5 are deposited on substrate 12 in the presence of a magnetic field which will cause the easy direction of magnetization 11 to be parallel to the desired direction of word line conductors 6. As indicated earlier, the easy direction of magnetization for all spots and for all regions within a spot will generally not be exactly parallel to word line conductors 6. It will be recognized that a deviation from parallelism has the effect of causing the transverse magnetizing force of the current in word line 6 to produce an undesired longitudinal component of magnetizing force. The devation determines the lower limit on the magnitude of the longitudinal field that must be produced by a current in conductor 4. The upper limit of the transverse magnetizing force produced by the current in conductor 6 is thought not to be limited in magnitude by the switching mechanism, since it is always terminated in the presence of a longitudinal field whose minimum amplitude guarantees that the direction of magnetization is in the desired direction.

The thin film magnetic elements 5 are deposited on substrate 12, which is typically glass of approximately 0.1 mm. thickness. A typical thin film element would be 1/16 of an inch (1.6 mm.) in diameter and 600 A. to 1,000 A. thick, spaced ten to the inch. Increasing the thickness of the thin film has the desirable effect of increasing the total amount of flux in the film. Therefore, a larger voltage is obtained in the sense winding when the flux is rotated than when a thinner film is used. Increasing the thickness of the film has the undesirable effect of reducing the threshold for wall motion. Typical values for films which have been found satisfactory for memory system operation are an average wall coercive $H_w$ of 2 oersteds and a value for $H_k$ of 2.4 oersteds.

When the evaporation technique is used for film deposition, the referred film composition is approximately 82% nickel and 18% iron in the melt. Values of $H_k$ (FIGURE 1) in the range of 2 to 3 oersteds have been achieved and have been found to be well suited to memory applications. It is relatively simple to achieve a field of 2 or 3 oersteds in these thin film elements by using a few turns of wire surrounding the thin film element carrying a moderate current.

In FIGURE 4, there is shown a word-organized memory system consisting of three words each having three digits. The words are arranged in rows and the digits in columns. The wire which energizes all the elements 5 in a row is called the word drive line 6, whereas the wire which energizes all the elements 5 is a column is called the digit drive line 4. A signal sense line 8 which is responsive to a flux change in any element 5 in a column parallels digit drive line 4 and provides information as to whether an interrogated element 5 in the column had been in the ONE or the ZERO state. The way in which information is read into and out of particular elements 5 of FIGURE 4 is best explained by reference to the timing diagram of FIGURE 5.

Although a functioning memory system operates on the basis of reading in or reading out complete words, the way in which FIGURE 4 functions is perhaps best understood by initially considering only how information is written into or read out of one digit of one word. The extension to all the digits in the word is then simple.

Consider that a curent pulse 51 of FIGURE 5 on word line 6' in conjunction with a current pulse 54 on digit line 4' has written in a ONE into thin film element 5''. The flux in the ONE state is arbitrarily assumed to be opposite in direction to arrow 11. If at a later time it is desired to read out the information contained in element 5'', it is necessary only to provide a current pulse 52 on word line 6'. The transverse magnetizing force produced by pulse 52 causes the flux in element 5'' to rotate from the easy axis direction to an approximate angle of 90° to said axis. Thus, if a ONE is stored in element 5'', the component of flux along the easy axis changes from a large value opposite to direction arrow 11 to essentially zero. This may be considered to be a flux change in the positive direction. This positive flux change causes a positive pulse 58 of FIGURE 5(*c*) to be induced in sense winding 8'.

In one mode of operation, a bias current 56 is maintained in all the digit lines 4, including line 4'. This bias current in digit line 4' causes the flux in element 5'' to complete the rotation from the 90 degree position to the ZERO direction given by direction arrow 11 at the termination of pulse 52. Thus, the magnetic element 5'' is left in the ZERO state.

If subsequently a word pulse 53 is applied to element 5'', which is in the ZERO state, the resultant 90 degree flux rotation causes the component of flux along the easy aixs to decrease from a large value in direction 11 to essentially zero, a negative flux change. This negative flux change causes a negative voltage 59 to be induced in sense winding 8'.

If it is desired to write a ONE into element 5'' after a read operation, a digit line pulse such as 55 is applied before word line pulse 53 has terminated. Pulse 55 insures that the flux will rotate to the ONE direction when pulse 53 has terminated. At the termination of pulse 55 the bias current 56 again is applied to digit line 4' but does not affect the direction of flux stored in element 5'' by pluse 55.

It is thus seen that the word line pules 51, 52 or 53 causes flux rotation whose direction of rotation indicates whether a ONE or ZERO has been stored in the element 5''; whereas whether a ONE or ZERO is written in element 5'' depends upon the direction of magnetizing force along the easy axis produced by current in the digit line 4' at the termination of the word line pulses 51, 52 or 53.

It is also possible to drive digit lines 4 with positive pulses 54' and 55' and negative pulse 50 instead of using positive pulses 54 and 55 and negative bias current 56. However, this requires an extra pulse source to provide pulse 50. In addition, the use of bias current 56 results in a larger ONE output than when pulse 50 is used.

Thus far, only one digit, element 5″ of the word on row 2 has been conesidered. This digit has been energized by digit line 4′. The other digit lines 4 and 4″ are simultaneously energized by currents similar to the waveforms of FIGURE 5(*c*) or 5(*e*) differing only in the selective absence or presence of pulses depending upon whether a ONE or ZERO is to be written into elements 5′ and 5‴. The presence or absence of pulses on the lines 4 is determined by the information register 1 which selectively energizes digit line drivers 2. Since the process of reading a word erases the information stored therein, the original information may be rewritten by energizing the appropriate digit lines 4 before the termination of the word pulse which was used for reading. Information register 1 can be used to select whether the destroyed word information available at terminals 10 is to be rewritten or whether new information is to be put into that word position. The selection of a particular word of a memory is accomplished by word selection matrix 7.

Since the digit line energizes a digit of a large number of words, it is necessary that repetitive application of a digit pulse current have no noticeable effect on the flux stored in a memory element 5. Values of magnetizing force less than $H'_W$ of FIGURE 3 are satisfactory. Typical values of pulse currents in a two turn word line 6 is 250 ma.; in a two turn digit line a 300 ma. pulse when 150 ma. bias is used; width of pulses 0.25$\mu$ sec.

The noise pulse 57 are caused by flux changes coupled from digit drive line 4 to the parallel sense line 8. The presence of noise pulses does not directly affect the signal since the noise will occur at a subsequent time. However, too large a noise pulse on sense line 8 can produce an overload condition in sense amplifier 9 whose recovery time may limit speed of memory operation.

If there are a large number of words in the memory, the transient disturbance which occurs because of the pulse on digit drive line 4 during the write time can be minimized by periodically reversing the direction of the sense line 8 relative to digit drive line 4 so that cancellation of the coupled flux is obtained. This reversal in direction of the sense winding 8 causes the polarity of the pulses obtained when going from a ONE to ZERO to be either positive or negative depending upon the location of the word being read. Therefore, in order to correctly distinguish between ZERO signals which are comparable in magnitude but opposite in polarity to ONE signals, it is necessary to have the word address determine which side of the sense difference amplifier 9 is interrogated.

The word selection matrix 7 of FIGURE 4 is shown in more detail in FIGURE 6. The circuit is a conventional coincident current type of core switching circuit capable of delivering the required current pulse of 250 ma. to one one of word lines 6 of FIGURE 4 from one of output lines 66. The lines 66 of FIGURE 6 are connected to corresponding lines 6 of FIGURE 4. A particular output winding 66′ may be selected by applying a current pulse to line 64′ and simultaneously applying a current pulse to line 65. The coordinate selectors and pulse drivers are represented by units 61 and 62.

In one design, the core switch secondaries 66 and serially connected word lines 6 were terminated in a resistor. It was found with this type of operation that the noise currents from the core switch are sufficiently large to cause a gradual deterioration of information in the thin film memory elements. Furthermore, the resistive termination provides a positive-negative pulse pair from the core. While the first pulse could be used for reading and the second for writing, the resultant operation was much slower than that afforded by sharing a single word line pulse for both reading and writing. The use of a diode in the secondary blocks the negative pulse of the pulse pair, and the diode nonlinearity suppresses the small noise currents from the core switch.

With the use of a diode per word line, the switch cores become redundant, since a single non-linearity per line is all that is logically required to perform the selection function. The wiring complexity of the core switch, heating at very high frequencies, and fairly inefficient operation, coupled with the fact that the word current output need be only unipolar pulse, makes the diode matrix configuration of FIGURE 7 attractive as a replacement for the core matrix of FIGURE 6.

If it is desired to energize line 81 of FIGURE 7 which corresponds to word drive line 6 of FIGURE 4, it is necessary to pulse trasistor 73 to the conduction or "on" condition by a pulse from X-coordinate selector unit 71. In addition, transistor 75 must be turned "off" simultaneously by a pulse from Y-coordinate selector 72. When this condition exists current will flow through transistor 73 its collector resistor 79, through diode 80 word drive line 81, resistor 78, and finally through direct current energy source 77. No current will flow in other word drive lines 81′, 81″ and 81‴ because of this series diodes 80′, 80″ and 80‴ will be back-biased to nonconduction. At the conclusion of the time coincident pulses from units 71 and 72, transistors 73 and 74 assume an "off" condition and transistors 75 and 76 assume an "on" condition, thereby causing no current to flow in any of the drive lines 81 because all diodes 80 will be biased to nonconduction.

Another feature of the present invention is its non-destructive read-out capability. FIGURE 8(*a*) shows a typical series of pulses, 82, 83, which can be applied to word drive line 6 of FIGURE 4 when non-destructive read out is desired. The time coincidence of pulse 82 on word line 6 and pulse 84 of FIGURE 8(*b*) on digit line 4 of FIGURE 4 causes a ZERO to be read into an element 5 of FIGURE 4. If subsequently, current pulses 83 alone are applied to word line 6 to produce a reversible 90° flux rotation in element 5, a positive pulse 88 of FIGURE 8(*c*) will be generated in sense winding 8 of FIGURE 4. The flux is rotated approximately 90° from the ZERO direction in the plane of element 5 by the application of pulse 83. The amplitude of pulse 83 must be such that operation is restricted to region IV of FIGURE 2, the region of reversible flux rotation. At the conclusion of pulse 83, the flux will rotate back 90° to its original ZERO direction and thereby generate a negative pulse 89 of the same magnitude as positive pulse 88.

If later a ONE is read into the same magnetic element 5 by the time coincidence of pulses 82 and 85 subsequent read-out pulses 83 will generate a negative pulse in sense winding 8 when the flux is rotated 90° from the ONE direction. A positive pulse is generated at the conclusion of the read-out pulses 83 when the flux returns from the 90° direction to the ONE direction. It is apparent that the pulse doublet which occurs at every read out pulse 83 requires that the sense winding 8 be gated at a time corresponding to either the beginning or the end of pulse 83 in order that the presence of a ONE or a ZERO be distinguished.

In the non-destructive read out system, the digit drive line does not conduct a bias current since the presence of a bias current in the digit line would decrease the magnitude of the word line current pulse 83 which could be applied and still have reversible flux rotation. As in the destructive read out technique, interference pulses 86 and 87 occur in sense line 8 because of coupling to digit drive line 4 carrying current pulses 84 and 85. Pulses also will continue to be generated in sense line 8 at a time corresponding to the leading edge of pulses 82. These output pulses on sense line 8 are not shown in FIGURE 8(*c*) for reasons of clarity of presentation.

The thin film memory elements described earlier were circular spots. The circular form has been found to be satisfactory, but rectangular spots are also desirable. Typically, rectangular spots 0.25 mm. wide and 1.5 mm. long with the easy axis along the length of the rectangle have been found satisfactory. The spots are spaced 0.5 mm. on center in one direction so that the linear bit density is increased over that obtainable with circular spots by a factor of five in one direction and remains unchanged in the other. This arrangement provides an increase in density where it is most needed (words/cm.), since there are many more words than digits. For such rectangles, $H_k$ increases with thickness due to shape anistropy, however, this increased $H_k$ is more than offset by the reduced width of the rectangular spot so that the current required to produce the transverse magnetizing field strength is reduced over that required for a circular spot whose diameter equals the long dimension of the rectangle. Further, there is no need to reduce thickness as would be required for circles having diameter equal to the small dimension of the rectangle and in fact the thickness can be increased somewhat over that of a circle where diameter is equal to the large dimension of the rectangle.

Since all the conductors shown in FIGURE 4 are straight lines, it is possible to fabricate these easily with conventional wire or printed wiring.

While there have been shown and described the fundamental novel features of the inveition as applied to preferred embodiments, it will be understood that various omissions, substitutions, and changes in the forms and details of the devices illustrated and its operation may be made by those skilled in the art without departing from the spirit of the invention.

What is claimed is:

1. An information storage device comprising a magnetic element having an easy axis of magnetization and appreciable remanent flux in either direction along said axis, a first means for producing a first magnetomotive force parallel to said axis and acting on said element, the magnitude of said first force being less than that required to produce irreversible change in magnitude of said remanent flux when acting alone upon said magnetic element, a second means for producing a second magnetomotive force transverse to said easy axis and acting on said element, the magnitude of said second force being sufficient to cause said remanent flux to rotate from a direction parallel to said easy axis to a direction substantially transverse to said easy axis, said parallel and transverse magnetomotive forces coacting for a predetermined time prior to the termination of said transverse force to produce irreversible flux rotation, whereby the direction along said axis of said parallel force at the termination of said transverse force determines the direction of the remanent flux.

2. Apparatus according to claim 1 comprising in addition a third means responsive to the change in the component of said remanent flux along said easy axis caused by said rotation of said flux by said transverse force, to sense the original direction of remanent flux along said axis.

3. An information storage device comprising a magnetic element having an easy axis of magnetization and appreciable remanent flux along said axis, a first current carrying conductor inductively coupled to said element to produce a magnetomotive force parallel to said axis, a first means for supplying a controlled amplitude current to said first conductor, the magnitude of said parallel force being less than the coercive force along said easy axis required to produce irreversible change in magnitude of said remanent flux when acting alone upon said magnetic element, a second current carrying conductor inductively coupled to said element to produce a magnetomotive force transverse to said axis, a second means for supplying a controlled amplitude current to said second conductor, the magnitude of said transverse force being sufficient to cause said remanent flux to rotate from a direction parallel to said easy axis to a direction substantially transverse to said axis when acting alone, said parallel and transverse magnetomotive forces coacting for a predetermined time prior to the termination of the transverse force to produce irreversible flux rotation, whereby the direction along said axis of said parallel force at the termination of said transverse force determines the direction of remanent flux after removal of said parallel force.

4. Apparatus according to claim 3 comprising in addition a third conductor parallel to said first conductor and inductively coupled to said element to produce an output pulse in response to a change in flux having a component along said easy axis, whereby the polarity of said output pulse is indicative of the direction of said remanent flux.

5. A magnetic memory for the storage of binary information comprising a plurality of individual magnetic elements arranged in rows and columns, each of said elements having an easy axis of magnetization in the row direction and an appreciable remanent flux in either direction along said axis, a plurality of row conductors, each of said row conductors being inductively coupled to every element in a given separate row and producing when energized a magnetomotive force transverse to said easy axis, a plurality of column conductors, each of said column conductors being inductively coupled to every element in a given separate column and producing when energized a magnetomotive force parallel to said easy axis, means for writing binary words into said array by applying simultaneously current pulses of one polarity to selected column conductors and current pulses of opposed polarity to the remaining column conductors in accordance with the binary code of a given word, said column currents being insufficient in magnitude to cause flux change when acting alone, means for applying to a selected row conductor a current pulse in time coincidence with said column pulses, said row current being sufficient when coacting with said column currents to produce irreversible flux change, means for terminating said row current pulse prior to the termination of said column pulses whereby the direction of remanent flux along the easy axis of the individual row elements after termination of said column pulses depends upon the pulse polarity representing said given binary word, and means for reading the binary words stored in said array by applying to a selected row conductor a current pulse, whereby pulses are induced in said column conductors of a polarity corresponding to the binary code of said given word.

6. The method for placing the remanent flux of a thin film magnetic element in a prescribed direction along the easy axis of magnetization thereof comprising the steps of applying in the prescribed direction parallel to said axis a first magnetomotive force having a magnitude below the easy axis coercive force of said element so that repeated application of said first force produces only reversible flux change in said element, applying transverse to said axis a second magnetomotive force having a magnitude sufficient to cause said remanent flux to rotate from a direction along said easy axis toward a direction transverse to said axis and to produce irreversible flux rotation in said element during time coincidence with said first force, the termination of said second force prior to the termination of said first force causing said remanent flux to assume the direction of said first force.

7. The method of sensing the original direction of remanent flux in a thin film magnetic element along the easy axis of magnetization thereof, comprising the steps of applying in a prescribed direction parallel to said axis a first magnetomotive force having a magnitude below the easy axis coercive force of said element so that repeated application of said first force produces only reversible flux change along said easy axis in said element, applying transverse to said axis a second magnetomotive force having a magnitude sufficient to cause said remanent flux to rotate from a direction along said axis toward a direction transverse to said axis and to produce irreversible flux rotation in said element during time coincidence with said first force, the termination of said second force prior to the termination of said first force causing said remanent flux to assume the direction of said first force, and detecting the direction of remanent flux rotation upon application of said second force.

8. An information storage device comprising a magnetic element having an easy axis of magnetization and appreciable remanent flux in either direction along said axis, a first means for producing a first magnetomotive force parallel to said axis and acting on said element, the magnitude of said first force being less than that required to produce irreversible change in magnitude of said remanent flux when acting alone upon said magnetic element, a second means for producing a second magnetomotive force transverse to said easy axis and acting on said element, the magnitude of said second force being sufficient to cause said remanent flux to undergo irreversible rotation when acting in time coincidence with said parallel force, said second means terminating said transverse force prior to said first means terminating said parallel force whereby the direction of said parallel force along said easy axis at the termination of said transverse force determines the direction of said remanent flux.

9. An information storage device comprising a magnetic element having an easy axis of magnetization and appreciable remanent flux in either direction along said axis, a first means for producing a first magnetomotive force parallel to said axis and acting on said element, the magnitude of said first force being less than that required to produce irreversible change in magnitude of said remanent flux when acting alone upon said magnetic element, a second means for producing a second magnetomotive force transverse to said easy axis and acting on said element, the magnitude of said second force being sufficient to cause said remanent flux to undergo irreversible rotation when acting alone upon said magnetic element, the time coincident application of said first and second forces acting to establish the remanent flux in said element in the direction of said first force, said second means terminating said transverse force while said first means continues to provide a parallel force.

10. An information storage device comprising a magnetic element having an easy axis of magnetization and appreciable remanent flux in either direction along said axis, a first means for producing a first magnetomotive force parallel to said axis and acting on said element, the magnitude of said first force being less than that required to produce irreversible change in magnitude of said remanent flux when acting alone upon said magnetic element, a second means for producing a second magnetomotive force transverse to said easy axis and acting on said element, the magnitude of said second force being sufficient to cause said remanent flux to undergo irreversible rotation when acting in time coincidence with said parallel force, said second means initiating said transverse force prior to said first means initiating said parallel force, said second means terminating said transverse force prior to said first means terminating said parallel force whereby the direction of said parallel force along said easy axis at the termination of said transverse force determines the direction of said remanent flux.

11. An information storage device comprising a magnetic element having an easy axis of magnetization and appreciable remanent flux in either direction along said axis, a first means for producing a first magnetomotive force substantially parallel to said axis and acting on said element, the magnitude of said parallel force when acting alone being less than that required to produce an irreversible flux change in said remanent flux, a second means for producing a second magnetomotive force substantially transverse to said axis, the magnitude of said transverse force being at least sufficient to cause irreversible flux rotation of said remanent flux when in time concidence with said parallel force, the minimum magnitude of said parallel force being of a magnitude sufficient to overcome the component of said substantially transverse force along said easy axis, said second means terminating said transverse magnetomotive force prior to terminating said parallel force by said first means, whereby the direction of the net force along said easy axis determines the direction of said remanent flux provided said transverse force is terminated prior to said parallel force.

12. In a magnetic memory array apparatus comprising a plurality of individual thin-film magnetic storage elements, each element having an easy axis of magnetization and appreciable remanent flux along said axis, said elements being arranged in rows and columns, wherein said easy axis direction of each element may deviate within prescribed limits from a nominal easy axis direction along said row, and the coercive force of each of said magnetic elements may deviate within prescribed limits from the average coercive force of all the elements, and the transverse saturation magnetizing force of each element also may deviate from an average value for all the elements; means for producing a magnetizing force parallel to said nominal easy axis in one direction upon selected columns of elements and in the opposite direction upon the remaining columns of elements, said parallel magnetizing force having a component along the easy axis of any element less than the lowest coercive force of any element, whereby said parallel magnetizing force acting alone may be repeatedly applied to said elements without causing perceptible flux change, means for producing a magnetizing force transverse to said nominal easy axis direction acting upon all the elements in a selected row, the magnitude of said transverse magnetizing force being at least sufficient to cause irreversible flux rotation of said remanent flux when occurring in time coincidence with said parallel force for a time at least equal to the switching time of said selected row elements, the minimum magnitude of the easy axis component of said parallel magnetizing force being greater than the component of said transverse magnetizing force along the easy axis of any element, said transverse force means ceasing to act on said selected elements prior to said parallel force means, whereby the direction of the remanent flux in said selected elements at the termination of said transverse magnetizing force is determined by the direction of the parallel magnetizing force acting on each element of said selected row at the termination of said transverse magnetizing force.

13. In a magnetic memory array apparatus comprising a plurality of individual magnetic storage elements, said elements having an easy axis of magnetization and appreciable remanent flux along said axis, said elements being arranged in rows and columns, said easy axis being in the same direction as a row, means for producing a magnetizing force transverse to said easy axis acting upon all the elements in a selected row to rotate said remanent flux to a position substantially transverse to said easy axis, means for producing a magnetizing force parallel to said easy axis in one direction upon selected columns of elements and in the opposite direction upon the remaining columns of elements, said parallel magnetizing force being less than the coercive force of each element in the absence of said transverse magnetizing force, said parallel and transverse magnetizing means producing said parallel and transverse magnetizing forces in time coincidence for a time at least equal to the switching time of said selected elements, said transverse means terminating said transverse magnetizing force while said parallel means produces a parallel force, whereby only said elements in said selected row undergo irreversible flux switching, with the direction of the remanent flux in said selected elements at the termination of said transverse magnetizing force being determined by the direction of the parallel magnetizing force acting on each element of said selected row at the termination of said transverse magnetizing force.

14. Apparatus as in claim 13 comprising in addition a plurality of sensing means, each sensing means being responsive to a flux change along said easy axis of each element in a separate column, whereby the remanent flux direction along the easy axis of the individual elements of the selected row prior to application of the transverse force may be determined, each of said sensing means producing a positive or negative signal depending on the direction of rotation of said remanent flux upon application of said transverse field to said selected row, the polarity of said signals on said sense means being independent of the absence or presence of said parallel forces.

15. A magnetic memory for the storage of binary information comprising a plurality of individual magnetic elements arranged in rows and columns, each of said elements having an easy axis of magnetization in the row direction and an appreciable remanent flux in either direction along said axis, a plurality of row conductors, each of said row conductors being inductively coupled to every element in a given separate row and producing when energized a magnetomotive force transverse to said easy axis, a plurality of column conductors, each of said column conductors being inductively coupled to every element in a given separate column and producing when energized a magnetomotive force parallel to said easy axis, a second plurality of column conductors, each of said second column conductors being inductively coupled to every element in a given separate column and responsive to flux change along said easy axis, means for reading out the binary information stored in a selected row by energizing the row conductor corresponding to the selected row with a current pulse of magnitude sufficient to cause rotation of said remanent flux from a direction along the easy axis toward a direction transverse to said easy axis, whereby each conductor of said second plurality of column conductors produces a signal pulse polarity dependent upon the direction of the remanent flux in each element of the selected row before rotation, means for writing binary information into said selected row by causing the current in each of said plurality of column conductors to assume one direction in selected column conductors and the opposite direction in the remaining column conductors in accordance with the binary information to be written into said selected row, each of said column currents being insufficient in magnitude to cause remanent flux change when acting alone, said assumption of current direction in each column conductor occurring after said current pulse in said row conductor has been initiated, said row current being sufficient when coacting with said column current to produce nonreversible flux rotation in each magnetic element of the selected row to the direction of the magnetic field of each of the separate column currents acting on each element, said current pulse in said row conductor being terminated while said column conductor currents are in the direction assumed, whereby the direction of the remanent flux along the easy axis of the individual elements of the selected row depends upon the assumed directions of column currents at the time said row pulse current is terminated, said remanent flux direction being unaffected by subsequent assumed directions of column currents in the absence of a current in the row including said elements.

16. A bistable magnetic device comprising a uniaxially anisotropic magnetic thin film having a preferred axis of magnetization, a first electrical conductor for applying a magnetic field to the film along the preferred axis, a second electrical conductor for applying a magnetic field to the film perpendicular to the preferred axis, means mounting the first and second conductors inclined to one another across the film, first current supply means selectively to supply first current pulses to said first conductor, and second current supply means selectively to supply to said second conductor second current pulses each of which flows concurrently with a said first pulse and has a trailing edge that occurs before the trailing edge of the said first pulse, each first pulse having a magnitude that is sufficient to effect a change in stable state of magnetization of the film only in the presence of magnetic polarization of the film perpendicular to the preferred axis that results from a said second pulse.

17. A bistable magnetic device according to claim 16 wherein said first conductor has two portions on opposite sides of the film.

18. A bistable magnetic device according to claim 16 wherein said second conductor has two portions on opposite side of the film.

19. A bistable magnetic device according to claim 16 wherein the magnitude of said magnetic polarization is substantially greater than 0.6 of the magnitude required to saturate the film in that direction.

20. A bistable magnetic device according to claim 16 wherein the film is of a nickel-iron alloy.

21. A bistable magnetic device according to claim 20 wherein said alloy is composed, at least substantially, of 82% nickel and 18% iron.

22. A bistable magnetic device according to claim 16 wherein the thickness of the film is within the range of 600 to 1,000 Angstrom units.

References Cited

UNITED STATES PATENTS

| | | | |
|---|---|---|---|
| 3,030,612 | 4/1962 | Rubens et al. | 340—174 |
| 3,058,099 | 10/1962 | Williams | 340—174 |

FOREIGN PATENTS

| | | |
|---|---|---|
| 1,190,683 | 4/1959 | France. |

OTHER REFERENCES

Publication I: "Nondestructive Sensing of Magnetic Cores," by Buck & Frank, in "Communications and Electronics," January 1954, pp. 822–830.

Publication II: "A Compact Coincident Current Memory," by Pohn and Rubens, in "Proceedings of Eastern Joint Computer Conference, Dec. 10–12, 1956," published June 1957, pp. 120–123.

Publication III: "Thin Films, Memory Elements," in "Electrical Manufacturing," vol. 61, No. 1, January 1958, pp. 95–98.

Publication IV: "Magnetization Reversal and Thin Films," by Smith, in "Journal of Applied Physics," vol. 29, No. 3, March 1958.

Publication V: "Operating Characteristics of a Thin Film Memory," by Raffel, in "Journal of Applied Physics," supplement to vol. 30, No. 4, April 1959.

Publication VI: "Using Thin Films in High-Speed Memories," by Bittmann, in "Electronics," June 5, 1959, pp. 55–57.

Publication VII: "The Nondestructive Read-Out of Magnetic Cores," by Popoulis, in "Proceedings of the I.R.E.," August 1954, pp. 1283–1288.

Publication VIII: "Preparation of Thin Magnetic Films and Their Properties," by Blois, in "Journal of Applied Physics," vol. 26, No. 8, August 1955, pp. 975–980.

Publication IX: "Coincident-Current Nondestructive Readout From Thin Magnetic Films," by Oakland and Rossing, in "Journal of Applied Physics," supplement to vol. 30, No. 4, April 1959, pp. 545–555.

Publication X: "Thin Film Memory," by Ford, in "IBM Technical Disclosure Bulletin," vol. 2, No. 5, February 1960, p. 84.

Publication XI: "Journal of Applied Physics," vol. 29, No. 3, March 1958, pp. 264–273.

Publication XII: "Journal of Applied Physics," vol. 29, No. 3, March 1958, pp. 274–282.

JAMES W. MOFFITT, Primary Examiner